US008051549B2

(12) United States Patent
Ishino et al.

(10) Patent No.: US 8,051,549 B2
(45) Date of Patent: Nov. 8, 2011

(54) METHOD FOR PRODUCING PLASMA DISPLAY PANEL

(75) Inventors: Shinichiro Ishino, Osaka (JP); Koyo Sakamoto, Osaka (JP); Kaname Mizokami, Kyoto (JP); Yoshinao Ooe, Kyoto (JP); Yuichiro Miyamae, Osaka (JP)

(73) Assignee: Panasonic Corporation, Osaka (JP)

( * ) Notice: Subject to any disclaimer, the term of this patent is extended or adjusted under 35 U.S.C. 154(b) by 124 days.

(21) Appl. No.: 12/676,995

(22) PCT Filed: Apr. 22, 2009

(86) PCT No.: PCT/JP2009/001843

§ 371 (c)(1),
(2), (4) Date: Mar. 8, 2010

(87) PCT Pub. No.: WO2009/130896

PCT Pub. Date: Oct. 29, 2009

(65) Prior Publication Data

US 2011/0126398 A1 Jun. 2, 2011

(30) Foreign Application Priority Data

Apr. 24, 2008 (JP) ................................ 2008-113559

(51) Int. Cl.
*H01S 4/00* (2006.01)

(52) U.S. Cl. ............. 29/592.1; 29/825; 29/830; 29/832; 29/846

(58) Field of Classification Search .................... 29/825, 29/830, 832, 840
See application file for complete search history.

(56) References Cited

U.S. PATENT DOCUMENTS 6,017,579 A 1/2000 Kano et al.
2003/0073042 A1 4/2003 Cernigliaro et al.

FOREIGN PATENT DOCUMENTS

EP 1 659 605 A2 5/2006
EP 1 806 762 A2 7/2007
JP 2000-227656 8/2000
JP 2001-93409 4/2001
JP 2002-260535 9/2002
JP 2005-343711 12/2005
JP 2007-48733 2/2007
JP 2007-59309 3/2007
JP 2009-59696 3/2009
KR 2008089930 A * 10/2008

OTHER PUBLICATIONS

International Search Report issued Jun. 2, 2009 in International (PCT) Application No. PCT/JP2009/001843.
An Extended European Search Report issued Mar. 18, 2011 in European Application No. 09 735 476.5.

* cited by examiner

*Primary Examiner* — Carl Arbes
(74) *Attorney, Agent, or Firm* — Wenderoth, Lind & Ponack, L.L.P.

(57) ABSTRACT

To realize a plasma display panel having display performances of high precision and high brightness with low power consumption, after formation of base film (91), a metal oxide paste made of metal oxide particles, an organic component including a photopolymerization initiator, a water-soluble cellulose derivative, and a photopolymerization monomer, and a diluting solvent is applied. By exposing, developing, and firing the paste film, agglomerated particles as a plurality of metal oxide particles agglomerated are formed so as to be attached on base film (91). The content of the metal oxide particles included in the metal oxide paste is 1.5% by volume or less.

2 Claims, 4 Drawing Sheets

METHOD FOR PRODUCING PLASMA DISPLAY PANEL

This application is a U.S. National Phase Application of PCT international application PCT/JP2009/001843.

TECHNICAL FIELD

The present invention relates to a method for producing plasma display panels.

BACKGROUND ART

A plasma display panel (hereinafter referred to simply as "PDP"), among other flat panel displays (FPD), allows achieving a high-speed display as well as a large-size display with ease. The PDP is thus commercialized in various fields such as video display devices and display devices for public communication.

In general, an AC-drive and surface discharge type PDP adopts 3-electrodes structure, and is formed of two glass substrates, i.e. a front panel and a rear panel confronting each other with a given space therebetween. The front panel includes display electrodes formed of scan electrodes and sustain electrodes, both of which are shaped like stripes and formed on the glass substrate, a dielectric layer covering the display electrodes and storing electric charges for working as a capacitor, and a protective film formed on the dielectric layer and having a thickness of approx. 1 μm. The rear panel includes multiple address electrodes formed on the other glass substrate, a primary dielectric layer covering the address electrodes, barrier ribs formed on the primary dielectric layer, and a phosphor layer painted onto display cells partitioned by the barrier ribs for emitting light in red, green and blue respectively.

The front panel confronts the rear panel such that its electrode-mounted surface confronts an electrode-mounted surface of the rear panel, and peripheries of both the panels are sealed in an airtight manner to form a discharge space therebetween, and the discharge space is partitioned by the barrier ribs. The discharge space is filled with discharge gas of Neon (Ne) and Xenon (Xe) at a pressure ranging from 53 kPa to 80.0 kPa. The PDP allows displaying a color video through this method: Voltages of video signals are selectively applied to the display electrodes for discharging, thereby producing ultra-violet rays, which excite the respective colors of the phosphor layers, so that colors in red, green, and blue are emitted, thereby achieving the display of a color video (Refer to Patent Document 1).

The protective layer formed on the dielectric layer of the front panel of the foregoing PDP is expected to carry out the two major functions: (1) protecting the dielectric layer from ion impact caused by the discharge, and (2) emitting primary electrons for generating address discharges. The protection of the dielectric layer from the ion impact plays an important role for preventing a discharge voltage from rising, and the emission of primary electrons for generating the address discharges also plays an important role for eliminating a miss in the address discharges because the miss causes flickers on videos.

To reduce the flickers on videos, the number of primary electrons emitted from the protective layer should be increased. For this purpose, silicon (Si) or aluminum (Al), for instance, is added to MgO.

In recent years, the number of high-definition TV receivers has increased, which requires the PDP to be manufactured at a lower cost, to consume a lower power, and to be a full HD (high-definition, 1920×1080 pixels, and progressive display) with a higher brightness. The characteristics of emitting electrons from the protective layer determine the picture quality, so that the control over the electron emission characteristics is vital for the picture quality.

In such a PDP, an attempt to improve the electron emission characteristic by making impurity mixed in a protective layer was made (Patent Document 2). However, in the case where impurity is mixed in the protective layer to improve the electron emission characteristic, simultaneously, charges are accumulated on the surface of the protective layer, and the attenuation rate that charges when used as a memory function decrease with time increases. Consequently, a countermeasure to increase application voltage is needed for suppressing the attenuation rate.

As described above, there is a challenge to satisfy two conflicting characteristics of the protective layer; high electron emission capacity, and low attenuation rate of charges as the memory function, that is, high charge retention characteristic.

[Prior Art Document]

[Patent Document]

[Patent Document 1] Unexamined Japanese Patent Publication No. 2007-48733

[Patent Document 2] Unexamined Japanese Patent Publication No. 2002-260535

DISCLOSURE OF THE INVENTION

The present invention provides a method for producing a PDP having a front panel including a dielectric layer for covering display electrodes formed on a substrate, and a protective layer formed on the dielectric layer, and a rear panel opposing to the front panel to form a discharge space therebetween, and including address electrodes formed along the direction intersecting with the display electrodes, and barrier ribs for partitioning the discharge space. The protective layer is manufactured with the method including the steps of; forming a base film by depositing the base film on the dielectric layer; forming a metal oxide paste film by painting a metal oxide paste containing metal oxide particles, an organic component, and a diluting agent onto the base film; exposing and developing the paste film to make the paste film remain in a predetermined pattern shape on the base film; and making the metal oxide particles attached onto the base film by removing the organic component by firing the paste film remaining on the base film. Content of the metal oxide particle in the metal oxide paste is 1.5% by volume or less, and the organic component contains a photopolymerization initiator, a water-soluble cellulose derivative, and a photopolymerization monomer.

With such a configuration, the paste film containing the metal oxide particles can be formed in a predetermined pattern shape on the base film, so that the metal oxide particle can be discretely and uniformly attached onto the entire surface of the base film, and a uniform distribution of coverage with the metal oxide particles over the entire surface is achievable. As a result, The PDP having display performances of high definition and high brightness with less power consumption, satisfying both improved electron emission characteristics and the electric charge retention characteristics can be realized.

DETAILED DESCRIPTION OF THE INVENTION

An exemplary embodiment of the present invention is demonstrated hereinafter with reference to the accompanying drawings.

Exemplary Embodiment

Figure 1:
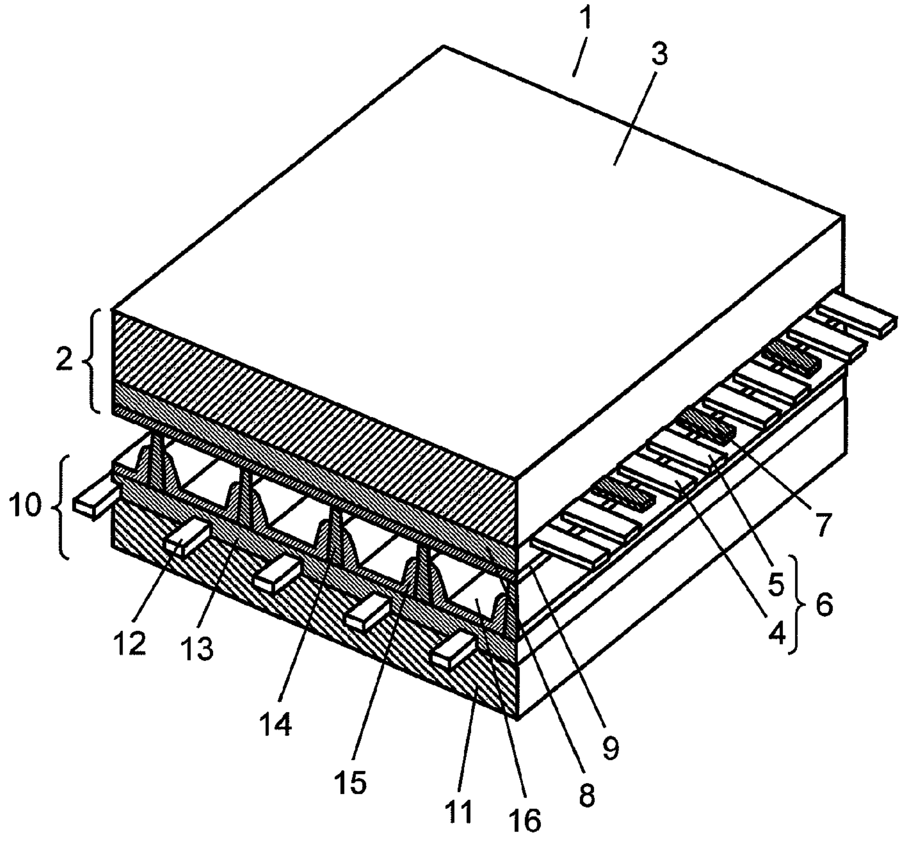
FIG. 1 shows a perspective view illustrating a structure of a PDP manufactured with a method for producing a PDP in accordance with an embodiment of the present invention.

FIG. 1 shows a perspective view illustrating a structure of PDP 1 manufactured with a method in accordance with the embodiment of the present invention. PDP 1 is formed of front panel 2, which includes front glass substrate 3, and rear panel 10, which includes rear glass substrate 11. Front panel 2 and rear panel 10 confront each other and the peripheries thereof are airtightly sealed with sealing agent such as glass frit, thereby forming discharge space 16, which is filled with discharge gas of Ne and Xe at a pressure falling within a range between 53.3 kPa and 80.0 kPa.

Multiple pairs of belt-like display electrodes 6, each of which is formed of scan electrode 4 and sustain electrode 5, are placed in parallel with multiple black-stripes (lightproof layers) 7 on front glass substrate 3 of front panel 2. Dielectric layer 8 working as a capacitor is formed on front glass substrate 3 such that layer 8 can cover display electrodes 6 and lightproof layers 7. On top of that, protective layer 9 made of magnesium oxide (MgO) is formed on the surface of dielectric layer 8.

Moreover, multiple belt-like address electrodes 12 are placed in parallel with one another on rear glass substrate 11 of rear panel 10, and they are placed along a direction intersecting at right angles with scan electrodes 4 and sustain electrodes 5 formed on front panel 2. Primary dielectric layer 13 covers those address electrodes 12. Barrier ribs 14 having a given height are formed on primary dielectric layer 13 placed between respective address electrodes 12, and they partition discharge space 16. Phosphor layers 15 are applied sequentially in response to respective address electrodes 12 onto grooves formed between each one of barrier ribs 14. Phosphor layers 15 emit light in red, blue, and green with an ultraviolet ray respectively. A discharge cell is formed at a junction point where scan electrode 4, sustain electrode 5 and address electrode 12 intersect with one another. The discharge cells having phosphor layers 15 of red, blue, and green respectively are placed along display electrodes 6, and these cells work as pixels for color display.

Figure 2:
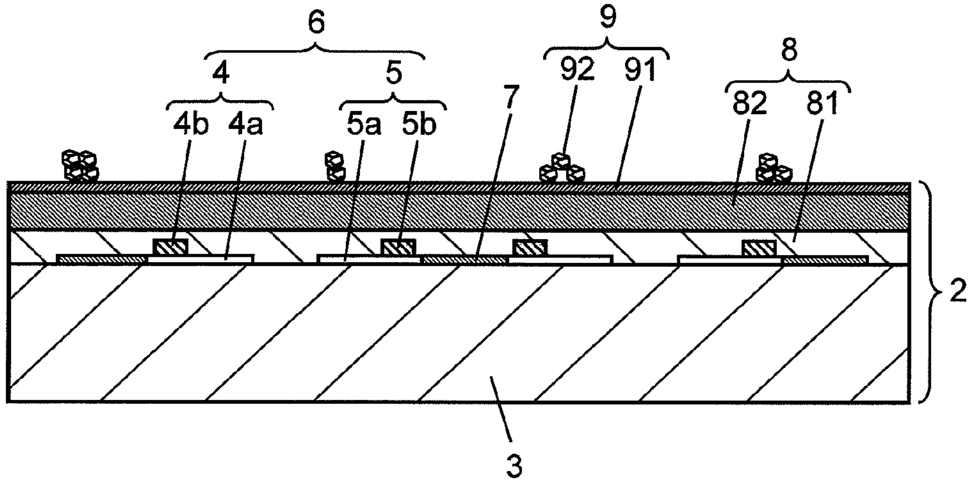
FIG. 2 shows a sectional view illustrating a structure of a front panel of the PDP shown in FIG. 1.

FIG. 2 shows a sectional view illustrating a structure of front panel 2 of PDP 1 in accordance with this embodiment. FIG. 2 shows front panel 2 upside down from that shown in FIG. 1. As shown in FIG. 2, display electrode 6 formed of scan electrode 4 and sustain electrode 5 is patterned on front glass substrate 3 manufactured by the float method. Black stripe (lightproof layer) 7 is also patterned together with display electrode 6 on substrate 3. Scan electrode 4 and sustain electrode 5 are respectively formed of transparent electrodes 4*a*, 5*a* made of indium tin oxide (ITO) or tin oxide ($SnO_2$), and metal bus electrodes 4*b*, 5*b* formed on transparent electrodes 4*a*, 5*a*. Metal bus electrodes 4*b*, 5*b* give electrical conductivity to transparent electrodes 4*a*, 5*a* along the longitudinal direction of electrodes 4*a*, 5*a*, and they are made of conductive material of which chief ingredient is silver (Ag).

Dielectric layer 8 is formed of at least two layers, i.e. first dielectric layer 81 that covers transparent electrodes 4*a*, 5*a* and metal bus electrodes 4*b*, 5*b* and light proof layer 7 formed on front glass substrate 3, and second dielectric layer 82 formed on first dielectric layer 81. On top of that, protective layer 9 is formed on second dielectric layer 82.

The structure of protective layer 9, which features the present invention, is detailed hereinafter.

As shown in FIG. 2, protective layer 9 is constructed by base film 91 and agglomerated particles 92 distributed on base film 91. Base film 91 is made of magnesium oxide (MgO) or magnesium oxide (MgO) containing aluminum (Al) on dielectric layer 8. Further, agglomerated particles 92 are dispersed discretely and almost uniformly on the entire surface of this base film 91. Aggregated particle 92 is formed by aggregating multiple crystal particles made of metal oxide, i.e. MgO. Agglomerated particles 92 are attached onto the entire surface of base film 91 and the coverage with particles 92 over the surface falls within the range from 2% to 12%.

The coverage in this context is expressed with this equation:

$$\text{Coverage }(\%)=a/b\times 100$$

where “a” represents an area where aggregated particles 92 are attached within one discharge cell, and “b” represents an area of one discharge cell. Actually the area can be measured this way: take a photo with a camera of an area of one discharge cell partitioned by barrier ribs 14, and then trim the photo into one cell in the dimension of x×y. Then binarize the photo having undergone the trimming into a binary image (data in black and white). Find the area “a”, i.e. black area occupied by aggregated particles 92, and find the coverage through the equation of coverage (%)=a/b×100.

A method for producing the PDP is demonstrated hereinafter. First, as shown in FIG. 2, form scan electrodes 4, sustain electrodes 5, and black stripe (lightproof layer) 7 on front glass substrate 3. Scan electrode 4 and sustain electrode 5 are respectively formed of transparent electrodes 4*a*, 5*a* and metal bus electrodes 4*b*, 5*b*. These transparent electrodes 4*a*, 5*a*, and metal bus electrodes 4*b*, 5*b* are patterned with a photo-lithography method. Transparent electrodes 4*a*, 5*a* are formed by using a thin-film process, and metal bus electrodes 4*b*, 5*b* are made by firing the paste containing silver (Ag) at a given temperature before the paste is hardened. Black stripe (lightproof layer) 7 is made by screen-printing the paste containing black pigment, or by forming the black pigment on the entire surface of glass substrate 3, and then patterning the pigment with the photolithography method before the paste is fired.

Next, paint the dielectric paste onto front glass substrate 3 with a die-coating method such that the paste can cover display electrode 6 formed of scan electrodes 4, sustain electrodes 5, and black stripe (lightproof layer) 7, thereby forming a dielectric paste layer (dielectric material layer, not shown). Then fire and harden the dielectric paste layer for forming dielectric layer 8 which covers scan electrodes 4, sustain electrodes 5 and black stripe (lightproof layer) 7. The dielectric paste is a kind of paint containing binder, solvent, and dielectric material such as glass powder.

Moreover, form base film 91 made of magnesium oxide (MgO) on dielectric layer 8 with the vacuum deposition method.

The foregoing steps allow forming predetermined structural elements (display electrodes 6, lightproof layer 7, dielectric layer 8 and base film 91), except aggregated particle 92 of PDP 1 in accordance with the embodiment of the present invention, on front glass substrate 3.

Figure 3:
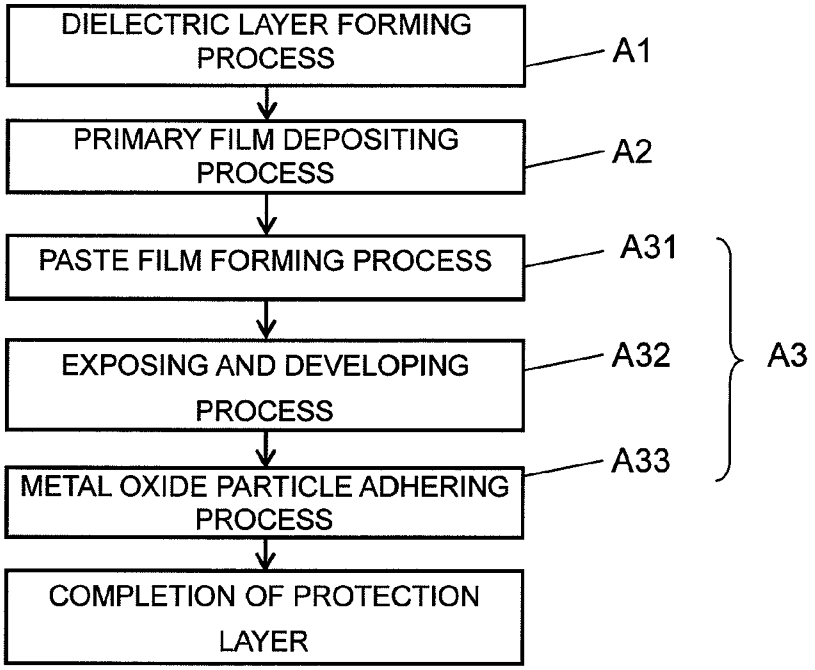
FIG. 3 shows a flowchart illustrating steps for forming a protective layer of the PDP.

The steps for producing protective layer 9 of PDP 1 in accordance with the embodiment of the present invention are demonstrated hereinafter with reference to FIG. 3. FIG. 3 shows a flowchart illustrating steps for forming protective layer 9 of PDP 1. As shown in FIG. 3, dielectric layer forming process step A1 is done for forming dielectric layer 8, and then base film depositing process step A2 is done for depositing base film 91 chiefly made of MgO on dielectric layer 8 with a vacuum deposition method by using sintered body of MgO containing some aluminum (Al).

Then attach discretely multiple aggregated particles 92 onto unfired base film 91 (agglomerated particle adhering process step A3), which is formed in step A2 for depositing the base film. Particle 92 is to be metal oxide particles and is formed by aggregating crystal particles of MgO.

Agglomerated particle adhering process A3 includes the following processes. Specifically, in paste film forming process A31, a metal oxide paste of a photopolymerization composition made of metal oxide particles as crystal particles of magnesium oxide (MgO), an organic component, and a diluting solvent is applied on base film 91, thereby forming a paste film. Next, in exposure and development process A32, the paste film formed on base film 91 is exposed and developed to make the paste film remain in a predetermined pattern shape on base film 91. In metal oxide particle adhering process A33, by firing the remaining paste film, the organic component in the metal oxide paste is eliminated, and protective layer 9 in which agglomerated particles 92 obtained by agglomerating crystal particles in the metal oxide are attached on base film 91 can be formed. As a result, protective layer 9 made of base film 91 and agglomerated particles 92 can be formed.

In exposure and development process A32, using active light having a predetermined wavelength and activating the photopolymerization initiator, such as ultraviolet rays, excimer laser, X-rays, electron beams, or the like, the metal oxide paste is exposed via a negative photomask in which a predetermined pattern shape is formed. Next, developing process is performed using water to dissolve and remove an unexposed part, thereby forming the paste film including the metal oxide particles in the predetermined pattern on base film 91. As an exposure apparatus, an ultraviolet irradiation apparatus generally used in photolithography, an exposure apparatus used at the time of producing semiconductor and liquid crystal display device, or the like can be used. As a developing solution, water can be used. As a developing method, a dipping method, a swinging method, a shower method, a spray method, a paddle method, or the like can be used.

In the firing process in metal oxide particle forming process A33, the organic component in the paste film remaining on base film 91 is thermally decomposed and vaporized in a predetermined temperature profile of few hundred degrees and atmosphere.

As a preceding process of exposure and development process A32, a drying process of drying the paste film is included.

As the details of the metal oxide paste of the present invention will be described later, the content of particles of the metal oxide contained in the metal oxide paste is 1.5% by volume or less, and the metal oxide paste contains, as organic components, a photopolymerization initiator, a water-soluble cellulose derivative, and a photopolymerization monomer. As the metal oxide particles dispersed in the metal oxide paste, basically, crystal particles as primary particles are dispersed. Those primary particles form several agglomerated particles in the paste, and the agglomerated particles are formed on base film 91.

In the foregoing discussion, base film 91 chiefly made of MgO is used; however, in accordance with the present invention, film 91 must withstand intensive sputtering because it should protect dielectric layer 8 from ion-impact, so that it is not necessarily to have high electron emission capability. Specifically, a conventional PDP often employs protective layer 9 formed of a base film chiefly made of MgO in order to satisfy both of the electron emission performance and withstanding performance to the sputtering at a certain level or higher than the certain level. The PDP of the present invention, however, employs the base film attached with crystal particles of metal oxide onto the film, and crystal particles of the metal oxide dominantly control the electron emission performance. Base film 91, therefore, is not necessarily made of MgO, but other materials more excellent in resistance to sputtering, such as $Al_2O_3$, can replace MgO.

In this embodiment, MgO particles are used as crystal particles of metal oxide; however, other crystal particles of metal oxide such as strontium (Sr), calcium (Ca), barium (Ba), and aluminum (Al) can replace MgO as long as they have the electron emission performance as high as MgO. Use of these metal oxides can also achieve similar advantages to the foregoing ones. A crystal particle is thus not limited to MgO.

The steps discussed above allow forming such structural elements on front glass substrate 3 as display electrodes 6, black stripe (lightproof layer) 7, dielectric layer 8, base film 91, and aggregated particles 92 of magnesium oxide (MgO).

Rear panel 10 is formed this way: First, form a material layer, which is a structural element of address electrode 12, by screen-printing the paste containing silver (Ag) onto rear glass substrate 11, or by patterning with the photolithography method a metal film which is formed in advance on the entire surface of rear glass substrate 11. Then fire the material layer at a given temperature, thereby forming address electrode 12. Next, form a dielectric paste layer (not shown) on rear glass substrate 11, on which address electrodes 12 are formed, by painting dielectric paste layer onto substrate 11 with the die-coating method such that the dielectric paste layer can cover address electrodes 12. Then fire the dielectric paste layer for forming primary dielectric layer 13. The dielectric paste is a kind of paint containing binder, solvent, and dielectric material such as glass powder.

Next, paint the paste containing the material for barrier rib 14 onto primary dielectric layer 13, and pattern the paste into a given shape, thereby forming a barrier-rib material layer. Then fire this barrier-rib material layer for forming barrier ribs 14. The photolithography method or a sand-blasting method can be used for patterning the paste for barrier ribs painted on primary dielectric layer 13. Next, paint the phosphor paste containing phosphor material onto primary dielectric layer 13 surrounded by barrier ribs 14 adjacent to one another and also onto lateral walls of barrier ribs 14. Then fire the phosphor paste for forming phosphor layer 15. The foregoing steps allow completely forming rear panel 10 including the predetermined structural elements on rear glass substrate 11.

Front panel 2 and rear panel 10 discussed above are placed opposite to each other such that display electrodes 6 intersect at right angles with address electrodes 12, and the peripheries of panel 2 and panel 10 are sealed with glass frit to form discharge space 16 between panels 2 and 10, and space 16 is filled with discharge gas including Ne, Xe. PDP 1 is thus completed.

The content of particles of the metal oxide contained in the metal oxide paste of the present invention is 1.5% by volume or less, and the metal oxide paste contains, as organic components, a photopolymerization initiator, a water-soluble cellulose derivative, and a photopolymerization composition such as a photopolymerization monomer.

A known photopolymerization initiator can be used. Examples of the photopolymerization initiator include benzophenones, benzoins, benzoin alkyl ethers, acetophenones, aminoacetophenones, benzyls, benzyl alkyl ketals, anthraquinones, ketals, and thioxanthones.

As concrete examples of the photopolymerization initiator include 2,4-bis-trichloromethyl-6-(3-bromo-4-methoxy) phenyl-s-triazine, 2,4-bis-trichloromethyl-6-(2-bromo-4-methoxy)phenyl-s-triazine, 2,4-bis-trichloromethyl-6-(3-bromo-4-methoxy)styrylphenyl-s-triazine, 2,4-bis-trichloromethyl-6-(2-bromo-4-methoxy)styrylphenyl-s-triazine, 2,4,6-trimethylbenzoyldiphenylphosphine oxide, 1-[4-(2-hydroxyethoxy)phenyl]-2-hydroxy-2-methyl-l-propan-1-one, 2,4-diethylthioxanthone, 2,4-dimethylthioxanthone, 2-chlorothioxanthone, 1-chloro-4-propoxythioxanthone, 3,3-dimethyl-4-methoxybenzophenone, benzopheneone, 1-(4-isopropylphenyl)-2-hydroxy-2-methylpropan-1-one, 1-(4-dodecylphenyl)-2-hydroxy-2-methyl-propan-1-one, 4-benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 4-dimethylaminobenzoate-2-ethylhexyl, 4-dimethylaminobenzoate-2-isoamyl, 2,2-diethoxyacetophenone, benzyl dimethyl ketal, benzyl-β-methoxyethyl acetal, 1-phenyl-1,2-propanedione-2-(o-ethoxycarbonyl) oxime, methyl o-benzoylbenzoate, benzyl, benzoin, benzoin methyl ether, benzoin isopropyl ether, benzoin-n-butyl ether, benzoin isobutyl ether, p-dimethylaminoacetophenone, p-tert-butyltrichloroacetophenone, p-tert-butyldichloroacetophenone, thioxanthone, 2-methylthioxanthone, 2-isopropylthioxanthone, dibenzosuberone, α,α-dichloro-4-phenoxyacetophenone, pentyl-4-dimethylaminobenzoate, and 2-(o-chlorophenyl)-4,5-diphenylimidazolyl dimer. They may be used either individually or as a combination of two or more thereof.

The photopolymerization initiator is suitably used in the range of 0.1 to 5% by volume, more preferably, 0.5% to 2% by volume in the photopolymerization composition. When the amount of the photopolymerization initiator is less than 0.1% by volume, curability by exposure decreases. When the photopolymerization initiator exceeds 5% by volume, poor patterning such as deterioration in resolution in development is seen.

Any known water-soluble cellulose derivatives can be used with no particular limitation. Examples of useful water-soluble cellulose derivatives include hydroxyethyl cellulose, hydroxyethylmethyl cellulose, hydroxypropyl cellulose, ethylhydroxyethyl cellulose, and hydroxypropylmethyl cellulose. They may be used either individually or as a mixture of two or more thereof.

The water-soluble derivative functions as a binder resin and has high transmittance to active light which is emitted to activate the photopolymeriztion initiator and start a polymerization reaction such as ultraviolet rays, excimer laser, X-rays, electron beams, or the like, so that a pattern can be formed with high precision.

The water-soluble cellulose derivative in the range of 5% to 20% by volume, more preferably, 8% to 12% by volume in the photopolymerization composition is suitably used. In the case where the water-soluble cellulose derivative is less than 5% by volume and is coated by screen printing, frictional force between a squeegee and a screen increases, so that knocking of the squeegee occurs, and printing performance deteriorates. In the case where the water-soluble cellulose derivative exceeds 20% by volume, at the time of forming a metal oxide paste film and firing it to eliminate the organic component, there is a phenomenon such that burn residue tends to remain.

A diluting solvent is not limited as long as it can be dissolved in the water-soluble cellulose derivative. Examples of the diluting solvent include ethylene glycol monomethyl ether, ethylene glycol monoethyl ether, propylene glycol monomethyl ether, propylene glycol monoethyl ether, diethylene glycol monomethyl ether, diethylene glycol monoethyl ether, diethylene glycol dimethyl ether, diethylene glycol diethyl ether, propylene glycol monomethyl ether acetate, propylene glycol monoethyl ether acetate, 2-methoxybutyl acetate, 3-methoxybutyl acetate, 4-methoxybutyl acetate, 2-methyl-3-methoxybutyl acetate, 3-methyl-3-methoxybutyl acetate, 3-ethyl-3-methoxybutyl acetate, 2-ethoxybutyl acetate, 4-ethoxybutyl acetate, 4-propoxybutyl acetate, and 2-methoxypentyl acetate. These solvents can be used either individually or as a combination of two or more thereof. A mixture of diethylene glycol monobutyl ether and terpineol is more preferable.

The photopolymerization monomer may be known one and is not particularly limited. Examples of the photopolymerization monomer include ethylene glycol diacrylate, ethylene glycol dimethacrylate, triethylene glycol diacrylate, triethylene glycol dimethacrylate, trimethylolpropane triacrylate, trimethylolpropane trimethacrylate, trimethylolethane triacrylate, trimethylolethane trimethacrylate, pentaerythritol diacrylate, pentaerythritol dimethacrylate, pentaerythritol triacrylate, pentaerythritol trimethacrylate, pentaerythritol tetraacrylate, pentaerythritol tetramethacrylate, dipentaerythritol tetraacrylate, dipentaerythritol tetramethacrylate, dipentaerythritol pentaacrylate, dipentaerythritol pentamethacrylate, dipentaerythritol hexaacrylate, dipentaerythritol hexamethacrylate, glycerol acrylate, glycerol methacrylate, and carboepoxy diacrylate.

The photopolymerization monomer in the range of 3% to 15% by volume, more preferably, 5% to 10% by volume in the photopolymerization composition is suitably used. In the case where the photopolymerization monomer is less than 3% by volume, hardening is insufficient at the time of exposure, and pattern peeling occurs at the time of development. The case where the photopolymerization monomer exceeds 15% by volume is unpreferable for reasons that the resolution deteriorates, and poor patterning is seen.

To the photopolymerization composition of the present invention, as necessary, an additive such as ultraviolet absorbers, sensitizers, sensitization assistants, polymerization inhibitors, plasticizers, thickeners, organic solvents, dispersants, defoaming agents, and organic or inorganic suspension stabilizers can be added.

The sensitizer is added in order to improve sensitivity to light. Concrete examples of such sensitizer include 2,4-diethylthioxanthone, isopropylthioxanthone, 2,3-bis(4-diethylaminobenzal)cyclopentanone, 2,6-bis(4-dimethylaminobenzal)cyclohexanone, 2,6-bis(4-dimethylaminobenzal)-4-methylcyclohexanone, 4,4-bis (dimethylamino)chalcone, 4,4-bis(diethylamino)chalcone, p-dimethylaminocinnamylideneindanone, p-dimethylaminobenzylideneindazone, 2-(p-dimethylaminophenylvinylene)-isonaphthothiazole, 1,3-bis(4-dimethylaminobenzal)acetone, 1,3-carbonyl-bis(4-diethylaminobenzal)acetone, 3,3-carbonyl-bis(7-diethylaminocoumarin), N-phenyl-N-ethylethanoamine, N-phenylethanolamine, N-tolyldiethanolamine, isoamyl dimethylaminobenzoate, isoamyl diethylaminobenzoate, 3-phenyl-5-benzoylthiotetrazole, and 1-phenyl-5-ethoxycarbonylthiotetrazole. These sensitizers may be used either individually or as a combination of two or more thereof.

The polymerization inhibitor is added in order to improve thermal stability during storage. Concrete examples of such polymerization inhibitor include hydroquinone, hydroquinonemonoesters, N-nitrosodiphenylamine, phenothiazine, p-t-butylcatechol, N-phenylnaphthylamine, 2,6-di-t-butyl-p-methylphenol, chloranil, and pyrogallol.

The plasticizer is added to improve printing performance. Examples of the plasticizer include dibutyl phthalate (DBP), dioctyl phthalate (DOP), polyethylene glycol, glycerol, and dibutyl tartrate.

The defoaming agent is added to reduce air bubbles in the photopolymerization composition and reduce voids in the metal oxide paste film. Examples of such a defoaming agent include defoaming agents of alkylene glycols such as polyethylene glycol (having a molecular weight of 400 to 800), silicones, and higher alcohols.

The above-described organic component is prepared in a paste or liquid state, and kneaded well with the metal oxide and the diluting solvent by a three-roll mill. The resultant is applied on a carrier film and dried in a sheet shape. The sheet may be laminated on a substrate. The resultant may be applied directly on a substrate by screen printing or the like, dried, exposed, and developed, thereby performing patterning.

In the case of using the resultant in the sheet shape, an example of the carrier film includes a flexible film such as a synthetic resin film having a thickness of 15 to 125 μm and made of polyethylene terephthalate, polyethylene, polypropylene, polycarbonate, and polyvinyl chloride. As necessary, release treatment such as silicon (Si) treatment may be given to the carrier film to facilitate transfer to a substrate or the like. To the sheet having such a photopolymerization composition, to improve stability in an unused time, a protective film may be attached. As such a protective film, a polyethylene terephthalate film, a polypropylene film, a polyethylene film, or the like having a thickness of about 15 to 125 μm and coated or baked with silicon can be used.

Next, a concrete example of a metal oxide paste used for the present invention will be described. In the embodiment of the present invention, the metal oxide paste having the composition shown in Table 1 was prepared.

TABLE 1

| | | Composition No. | | |
|---|---|---|---|---|
| | | Composition (1) | Composition (2) | Composition (3) |
| Metal oxide | MgO particle | 1.0 | 1.0 | 1.0 |
| Water-soluble cellulose derivative | Hydroxy-propyl cellulose | 10.0 | 10.0 | 10.0 |
| Photopoly-merization monomer | H0-MPP | 8.0 | 8.0 | 8.0 |
| Photopoly-merization initiator | IR-907 | 0.9 | 0.09 | 4.5 |
| | DETX | 0.1 | 0.01 | 0.5 |
| Diluting solvent | Diethylene glycol monobutyl ether | 60.0 | 60.7 | 57.0 |
| | Terpineol | 20.0 | 20.2 | 19.0 |
| Total | | 100.0 | 100.0 | 100.0 |

Numerial value unit in table is vol %

Specifically, hydroxypropyl cellulose as a water-soluble derivative was mixed in a diluting solvent of diethylene glycol monomethyl ether and terpineol. The mixture was agitated and dissolved while being heated, thereby becoming a hydroxypropyl cellulose solution. Next, the solution was set at room temperature. To the solution, 2-methacryloyloxyethyl-2-hydroxypropylphthalate (trade name: HO-MPP manufactured by Kyoeisha Chemical Co., Ltd.) as the photopolymerization monomer, 2-methyl-1[4-(methylthio)phenyl]-2-morpholino-propane-1-one (trade name: IR-907 manufactured by Ciba Geigy-Ltd.) as a photopolymerization initiator, and diethyl thioxanthone (trade name: DETX-S manufactured by Nippon Kayaku Co., Ltd.) were added and dissolved to prepare an organic vehicle. The organic vehicle and magnesium oxide (MgO) as the metal oxide particles were mixed and dispersed by a triple roller mill, thereby producing a photopolymerization composition. To the photopolymerization composition, further, diethylene glycol monobutyl ether and terpineol were added. Viscosity was adjusted, and the resultant was subjected to filtering using a filter of 30 μm. As a result, a metal oxide paste was obtained.

Table 1 shows composition (1), composition (2), and composition (3) with different contents in the metal oxide paste. Adhesion to the substrate and resolution in the exposing and developing process in those compositions were evaluated.

The metal oxide paste prepared as described above was applied on the substrate in which scan electrodes 4, sustain electrodes 5, shielding layer 7, dielectric layer 8, and base film 91 are formed as shown in FIG. 2 by using screen printing, thereby forming a metal oxide paste film. After that, the film was dried at 95° C. for five minutes. As a screen, L380S mesh as used.

Next, the film was irradiated with active light via a photomask for forming a negative pattern to expose the metal oxide paste film with exposure amount of 100 mJ/cm$^2$. After that, the film was developed for time which is twice as long as that of the break point by the spraying method with urban water held at 30° C., and parts which were not cured with light were eluted into water. The “breakpoint” is time required for all of the paste to be dissolved in a developing solution in the case where the paste of the photopolymerization composition is developed without being exposed.

A photo mask for pattern formation is made by a glass substrate which transmits active light and is constructed by a shielding part which is coated or dyed with pigment or paint of black that absorbs the active light, and a transmitting part which transmits the active light.

In a photo mask for evaluation adhesion, transmitting parts having nine different widths of 200 μm, 150 μm, 100 μm, 75 μm, 50 μm, 40 μm, 30 μm, 20 μm, and 10 μm are formed. Five transmitting parts per width, total 90 transmitting parts are provided in the light shielding part. The transmitting parts having the same width are adjacent to each other at an interval which is twice as large as the width. That is, in the case of the transmitting part having a width of 50 μm, the transmitting part having a width of 50 μm and the shielding part having a width of 100 μm are alternately provided.

When the metal oxide paste film is irradiated with the active light via the photo mask, only the active light incident on the transmitting part passes and is incident on the paste film. The paste film is exposed in the pattern shape of the transmitting parts in the photo mask. In the exposed parts in the paste film of the photopolymerization composition, photopolymerization occurs in the whole region in the thickness direction, and a plurality of line-shaped latent images having different widths are formed in the paste film. By developing it, a projected pattern in which lines having different widths are formed on the substrate can be obtained.

On the other hand, in a photo mask for evaluation resolution, shielding parts having nine different widths of 200 μm, 150 μm, 100 μm, 75 μm, 50 μm, 40 μm, 30 μm, 20 μm, and 10 μm are formed. Five transmitting parts per width, total 90 shielding parts are provided in the light transmitting part. The shielding parts having the same width are adjacent to each other at an interval which is twice as large as the width. Specifically, in the case of the shielding part having a width of 50 μm, the shielding part having a width of 50 μm and the transmitting part having a width of 100 μm are alternately provided. When the paste film is irradiated with the active light via the photo mask, only the active light incident on the transmitting part passes and is incident on the paste film, and the paste film is exposed. By developing the resultant, a recessed pattern in which lines having different widths are formed on the substrate can be obtained.

In the patterns obtained as described above, adhesion is evaluated in the projected part, and resolution is evaluated in the recessed part.

The adhesion is evaluated based on the pattern obtained by using such a photo mask. As described above, when the paste film is exposed, if light cure is performed sufficiently, five projections in each of the widths of 200 μm, 150 μm, 100 μm, 75 μm, 50 μm, 40 μm, 30 μm, 20 μm, and 10 μm are formed on the substrate. However, when light cure in the bottom of the paste film is insufficient, latent image parts are eluted into the developing solution and projections are not formed on the substrate. In this case, whether or not the projections in line shapes cured with light passed through the transmitting parts of nine different widths and formed on the substrate are formed in a state where they are sufficiently attached after development is observed and adhesion is evaluated. For example, at the time of exposure of 50 mJ/cm$^2$, the line width (μm) of the transmitting part on the pattern side corresponding to the smallest projection formed in a state where all of five transmitting parts are attached on the substrate out of the nine kinds of transmitting parts is observed.

On the other hand, resolution is evaluated as follows. When cure goes well to the exposure amount, five recesses in each of the widths of 200 μm, 150 μm, 100 μm, 75 μm, 50 μm, 40 μm, 30 μm, 20 μm, and 10 μm are formed in the substrate. However, when sensitivity of the photopolymerization composition is high, a photopolymerization reaction occurs also in the shielding parts, parts which should be eluted in the developing solution are also cured, and recesses are not formed in the substrate. In this case, the recess shapes of nine different widths after development are observed, and the line width (μm) of the shielding part on the pattern side corresponding to the recess having the smallest width in a state where all of five recesses are completely eluted is observed.

As a result, in Table 1, the pattern after development of the composition (1) is excellent with adhesion of 10 μm and resolution of 10 μm. However, in composition (2), the photopolymerization reaction is not insufficient, so that the pattern is peeled off during development, and the pattern of the metal oxide paste film cannot be formed. On the other hand, in the composition (3), the photopolymerization reaction occurs even in the shielding parts, so that good recesses cannot be formed, and excellent resolution cannot be obtained.

As a result, when the metal oxide paste of the composition (1) in Table 1 is used, by performing the exposing and developing process via the mask pattern in a predetermined shape, agglomerated particles 92 made of the metal oxide can be disposed dispersedly on the entire surface of base film 91 at predetermined coverage. It is also possible to distribute agglomerated particles 92 made of the metal oxide at optimum coverage only to pixels.

As described above, in PDP 1 in the embodiment of the invention, from the viewpoint of the discharge characteristic, the coverage of agglomerated particles 92 of magnesium oxide (MgO) is desirably in the range of 2% to 12%. Since the coverage is determined by the thickness of the metal oxide paste film, based on the range of thickness of a film which can be formed by screen printing, the content of magnesium oxide (MgO) particles in the metal oxide paste is preferably in the range of 0.01% by volume to 1.5% by volume.

As described above, content of particles of the metal oxide included in the metal oxide paste containing particles of the metal oxide, the organic resin component, and the diluting solvent is set to 1.5% by volume or less, and the organic component includes a photopolymerization initiator, a water-soluble cellulose derivative, and a photopolymerization monomer. As a result, when such a metal oxide paste is used, not only viscosity characteristic but also dispersiveness, printing performance, and burning quality are stabilized, and a pattern can be formed with high precision by exposure and development. Therefore, dispersion onto base film 91 can be controlled with high precision.

Next, the performance of PDP 1 is compared with those of other samples. This experiment is described hereinafter. PDP 1 is produced with the method for producing PDPs in accordance with the embodiment of the present invention.

Figure 4:
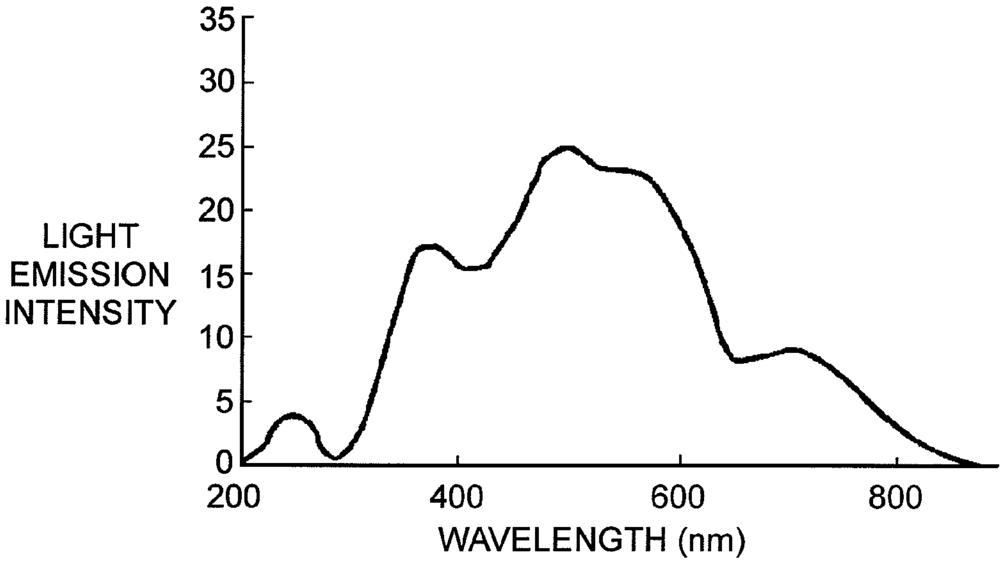
FIG. 4 shows cathode luminescence of crystal particles.

First, samples of PDP having different structures in protective layer 9 are prepared. Sample 1 is PDP of which protective layer 9 is formed of only base film 91 made of MgO. Sample 2 is PDP of which protective layer 9 is formed of base film 91 made of MgO into which impurity such as aluminum (Al) or silicon (Si) is doped. Sample 3 is PDP in accordance with the embodiment of the present invention. This PDP 1 of sample 3 includes protective layer 9 having base film 91 made of MgO, and aggregated particles 92, formed by aggregating multiple crystal particles of metal oxide, and attached on surface of film 91. Sample 3 employs single crystal particles made of metal oxide, namely, magnesium oxide (MgO). Cathode luminescence of the single crystal particle employed in sample 3 is measured to find the characteristics as shown in FIG. 4.

Those three samples of PDP having different structures from one another in protective layer 9 are tested for the electron emission performance and the electric charge retention performance.

The electron emission performance is a numerical value, i.e. a greater value indicates a greater amount of electron emitted, and is expressed with an amount of primary electron emitted, which is determined by a surface condition and a type of gas. The amount of primary electron emitted can be measured with a method that is used for measuring an amount of electron-current emitted from the surface of protective layer 9 through irradiating the surface with ions or an electron beam. However, it is difficult to test the surface of front panel 2 with a non-destructive examination. The evaluation method disclosed in Unexamined Japanese Patent Publication No. 2007-48733 is thus employed to measure a discharge delay ("ts" value) as the electron emission performance. In other words, a statistical delay time, which is a reference to the easiness of discharge occurrence, among delay times in discharge is measured. This reference number is inversed, and then integrated, thereby obtaining a value which linearly corresponds to the amount of emitted primary electrons, so that the value is used for the test. The delay time in discharge expresses the time of discharge delay (hereinafter referred to as "ts" value) from the pulse rising, and the discharge delay is chiefly caused by the struggle of the initial electrons, which trigger off the discharge, for emitting from the surface of protective layer 9 into discharge space 16.

The electric charge retention performance is expressed with a voltage value applied to scan electrodes 4 (hereinafter referred to as a "Vscn" lighting voltage), which is needed for suppressing an electron emission phenomenon of PDP1. To be more specific, higher electric charge retention performance can be expected at a lower Vscn lighting voltage, so that a lower Vscn voltage allows the PDP to be driven at a lower voltage design-wise. As a result, the power supply and electric components with a smaller withstanding voltage and a smaller capacity can be employed. In the existing products, semiconductor switching elements such as MOSFET are used for applying a scan voltage sequentially, and these switching elements have approx. 150 V as a withstanding voltage. The Vscn lighting voltage is thus preferably lowered to not greater than 120 V in the environment of 70° C. taking it into consideration that some change can occur due to variation caused by temperature.

Figure 5:
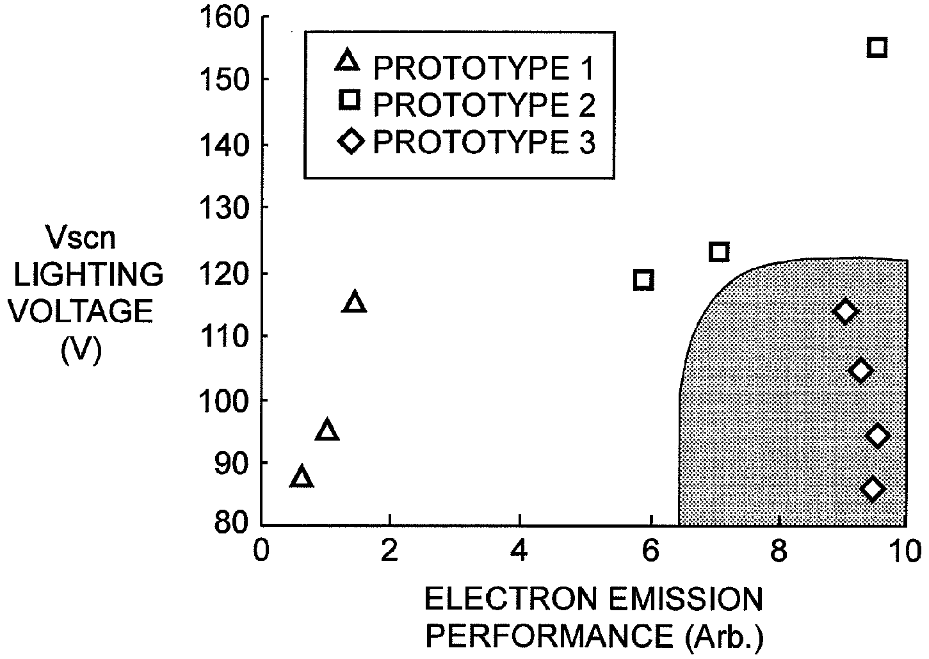
FIG. 5 shows electron emission performances of PDPs in accordance with the embodiment of the invention and the characteristics of Vscn lighting voltage.

FIG. 5 shows the relation between the electron emission performance and the electric charge retention performance. The horizontal axis of FIG. 5 represents the electron emission performance, and the test result of sample 1 is shown as a reference value. As FIG. 5 explicitly depicts, sample 3 can achieve controlling Vscn lighting voltage to be not greater than 120V in the electric charge retention test, and yet, it can achieve approx. six times or more as good as sample 1 in the electron emission performance. Sample 3 includes, as described previously, aggregated particles 92 each of which is formed by aggregating multiple crystal particles of MgO, and particles 92 are discretely and uniformly distributed on the entire surface of base film 91 made of MgO.

In general, the electron emission performance and the electric charge retention performance of protective layer 9 of PDP conflict with each other. For instance, a change in film forming condition of protective layer 9, or doping an impurity such as Al, Si, or Ba into protective layer 9 during the film forming process, as in sample 2, will improve the electron emission performance; however, the change or the doping will raise the Vscn lighting voltage as a side effect.

The present invention, however, allows obtaining protective layer 9 which can satisfy both of the electron emission performance and the electric charge retention performance appropriate to the PDP which is required to display an increased number of scanning lines as well as to have the smaller size cells due to the advent of high definition display.

Next, a particle diameter of the crystal particles employed in sample 3 is described hereinafter. The particle diameter refers to an average particle diameter, which means a volume cumulative average diameter (D50).

Figure 6:
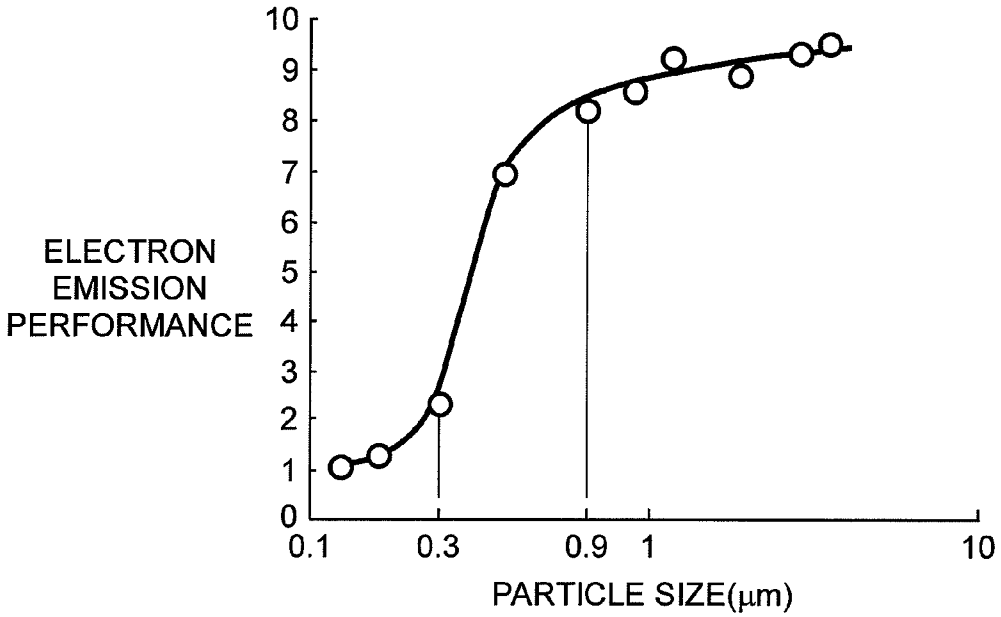
FIG. 6 shows a relation between a diameter of a crystal particle and the electron emission performance.

FIG. 6 shows a test result of sample 3 described in FIG. 5, and the test is done for the electron emission performance by changing a particle diameter of the crystal particle of MgO. In FIG. 6, the diameter of the crystal particle of magnesium oxide (MgO) shows an average diameter measured with the micro-track HRA particle-size distribution meter in ethanol solution of the first grade reagent defined by JIS or the higher grade of the reagent, and the crystal particle is observed in scanning electron microscope (SEM) photo to be measured.

As shown in FIG. 6, the particle diameter as small as 0.3 μm results in the lower electron emission performance, while the particle diameter as great as 0.9 μm or more results in the higher electron emission performance.

A greater number of crystal particles per unit area on protective layer 9 is preferable for increasing the number of emitted electrons within a discharge cell. However, the experiment teaches the inventors the following fact: presence of the crystal particles at the top of barrier rib 14 of rear panel, with which protective layer 9 of front panel 2 closely contacts, breaks the top of barrier rib 14, and then the material of rib 14 falls on phosphor layer 15, so that the cell encountering this problem cannot normally turn on or off. This breakage in the barrier ribs resists occurring when the crystal particles do not exist at the top of barrier rib 14, so that a greater number of the crystal particles will increase the occurrence of breakage in barrier ribs 14.

Figure 7:
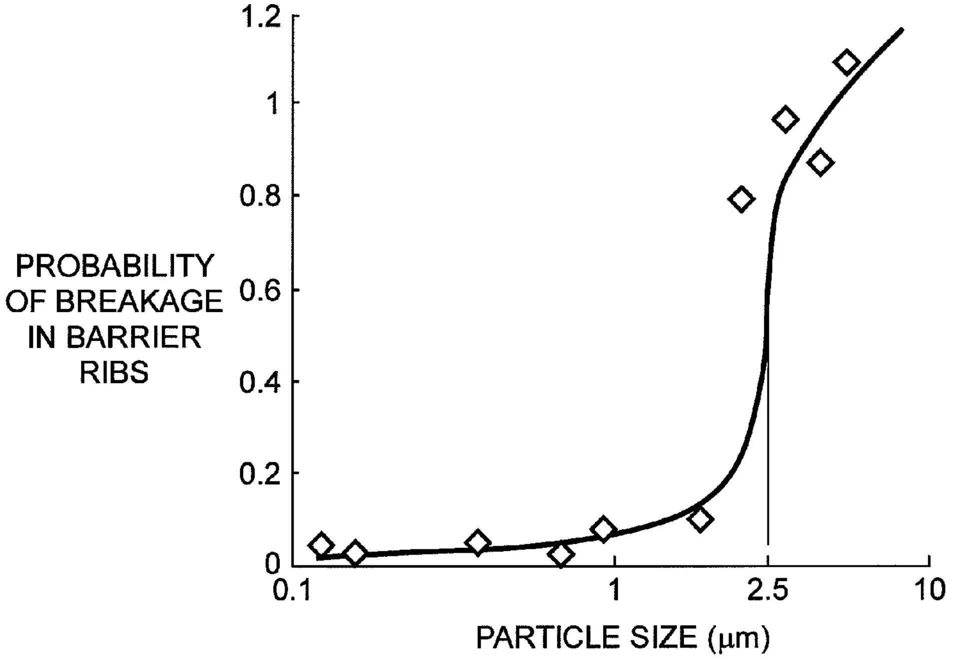
FIG. 7 shows a relation between a diameter of a crystal particle and probability of breakage in barrier ribs.

FIG. 7 shows relations between the particle diameter of the crystal particle and the breakage in barrier rib 14 in sample 3 of the present invention as described in FIG. 5. The same numbers of the crystal particles per unit area although they have different diameters are sprayed in sample 3. As FIG. 7 explicitly depicts, the probability of breakage in barrier ribs 14 sharply increases when the diameter of the crystal particle becomes as large as 2.5 μm; however, it stays at a rather low level when the diameter stays not greater than 2.5 μm.

The result tells that aggregated particle 92 preferably has a particle diameter within a range from 0.9 μm to 2.5 μm in protective layer 9 of PDP 1 in accordance with the present invention. However, when PDP1 is mass-produced, it is necessary to consider a dispersion of crystal particles in producing and a dispersion of protective layers 9 in producing.

Figure 8:
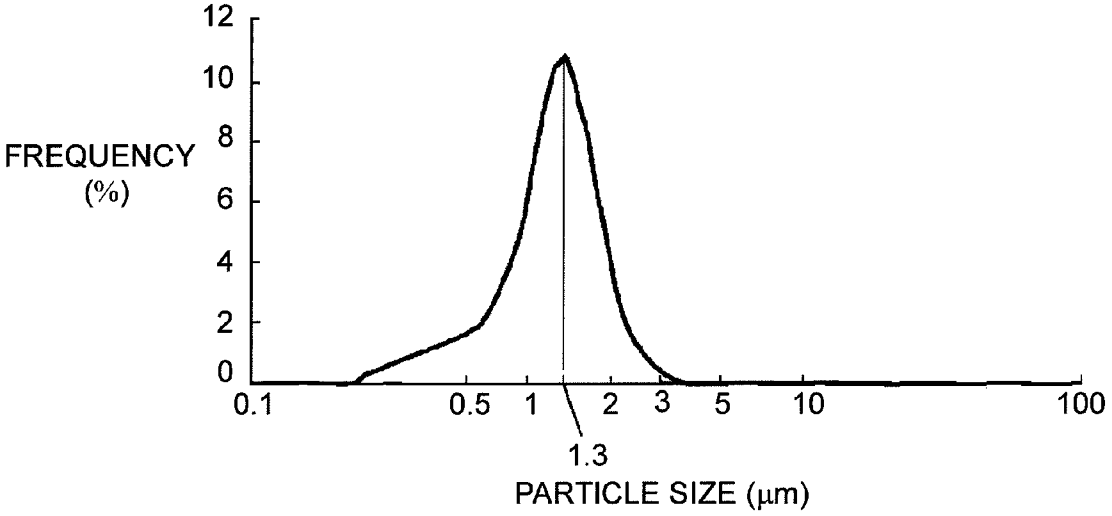
FIG. 8 shows an example of particle size distribution of the aggregated particle.

FIG. 8 shows an instance of particle size distribution of aggregated particle 92 employed in PDP1 of the present invention. Aggregated particle 92 has the particle size distribution as shown in FIG. 8, and the electron emission characteristics shown in FIG. 6 and barrier-rib breakage characteristics shown in FIG. 7 teach that it is preferable to use the aggregated particles, of which average particle diameter, i.e. volume cumulative average diameter (D50), falls within a range from 0.9 μm to 2 μm.

As discussed above, PDP 1 having protective layer 9 formed of metal oxide in accordance with this embodiment achieves electron emission performance more than six times as good as sample 1, and also achieves the electric charge retention performance such as the Vscn lighting voltage not greater than 120 V. As a result, PDP1 thus can satisfy both of the electron emission performance and the electric charge retention performance, although protective layer 9 of PDP1 is to display an increased number of scanning lines as well as to have the smaller size cells due to the advent of high definition display. The PDP, which can display a high definition video at high luminance with lower power consumption, is thus obtainable.

In PDP 1 of the present invention, aggregated particles 92 formed of crystal particles of MgO are attached with the coverage ranging from 2% to 12%. This coverage range derives from the experiments for characteristics of the samples of which coverage with aggregated particles 92 over base film 91 differs from one another. To be more specific, the experiments prove that the Vscn lighting voltage rises at a greater coverage with aggregated particles 92, so that the electric charge retention performance degrades. To the contrary, the Vscn lighting voltage lowers at a smaller coverage. The experiments teach the inventors that the coverage not greater than 12% can take full advantage of aggregated particles 92 and attached onto the surface of base film 91.

Aggregated particles 92 of MgO, on the other hand, are needed in each one of the discharge cells for reducing the dispersion of the characteristics. Aggregated particles 92 should be thus attached on the entire surface of base film 91. A smaller coverage tends to increase the dispersion in the surface, and attachment of particles 92 to each discharge cell differs greatly from one another. The experiments also teach the inventors that attachment of particles 92 formed of crystal particles of MgO at the coverage of 4% or more allows reducing the dispersion approx. not greater than 4%, and the attachment of particles 92 at the coverage of 2% or more allows reducing the dispersion approx. at 6%, which causes practically no problem. To realize the coverage, the content of the magnesium oxide (MgO) particles in the metal oxide paste is preferably in the range of 0.01% by volume to 1.5% by volume.

INDUSTRIAL APPLICABILITY

The present invention is useful for providing a PDP capable of displaying high definition at high luminance with lower power consumption.

| DESCRIPTION OF REFERENCE MARKS | |
|---|---|
| 1 | PDP |
| 2 | front panel |
| 3 | front glass substrate |
| 4 | scan electrode |
| 4a, 5a | transparent electrode |
| 4b, 5b | metal bus electrode |
| 5 | sustain electrode |
| 6 | display electrode |
| 7 | black stripe (lightproof layer) |
| 8 | dielectric layer |
| 9 | protective layer |
| 10 | rear panel |
| 11 | rear glass substrate |
| 12 | address electrode |
| 13 | primary dielectric layer |
| 14 | barrier rib |
| 15 | phosphor layer |
| 16 | discharge space |
| 81 | first dielectric layer |
| 82 | second dielectric layer |
| 91 | base film |
| 92 | aggregated particle |

The invention claimed is:

1. A method for producing a plasma display panel, the plasma display panel having:

a front panel including a dielectric layer for covering a display electrode formed on a substrate, and a protective layer formed on the dielectric layer; and a rear panel opposing to the front panel for forming a discharge space between the front panel and the rear panel, and including an address electrode formed along a direction intersecting with the display electrode, and a barrier rib for partitioning the discharge space, wherein a protective layer forming step of forming the protective layer of the front panel comprises:

a base film forming step of forming a base film on the dielectric layer by vapor deposition;

a paste film forming step of forming a metal oxide paste film by applying a metal oxide paste containing metal oxide particles, an organic component, and a diluting solvent on the base film;

an exposing and developing step of exposing and developing the paste film to make the paste film remain in a predetermined pattern shape on the base film; and a metal oxide particle adhering step of making the metal oxide particles attached onto the base film by removing the organic component by firing the paste film remaining on the base film, wherein a content of the metal oxide particles in the metal oxide paste is 1.5% by volume or less, and the organic component includes a photopolymerization initiator, a water-soluble cellulose derivative, and a photopolymerization monomer.

2. The method for producing a plasma display panel according to claim 1, wherein content of the metal oxide particles included in the metal oxide paste is 0.01% by volume or larger.

* * * * *